United States Patent [19]

Berejik et al.

[11] Patent Number: 4,964,598
[45] Date of Patent: Oct. 23, 1990

[54] APPARATUS AND METHOD FOR CONTROLLING AIRCRAFT, PARTICULARLY REMOTELY-CONTROLLED AIRCRAFT

[75] Inventors: Zacharia Berejik, Ramot Tzahala; Allon Wallach, Moshav Talmei Elazar, both of Israel

[73] Assignee: B.T.A. Automatic Piloting Systems Ltd., Tel Aviv, Israel

[21] Appl. No.: 285,918

[22] Filed: Dec. 19, 1988

[30] Foreign Application Priority Data

Mar. 14, 1988 [IL] Israel ................................. 85731

[51] Int. Cl.⁵ ............................................ B64C 13/20
[52] U.S. Cl. .................................. 244/190; 244/3.11; 244/179; 244/189
[58] Field of Search ............... 244/190, 192, 189, 194, 244/184, 179, 89, 90 R, 3.11, 3.14, 3.21

[56] References Cited

U.S. PATENT DOCUMENTS 4,054,254 10/1977 Cole ................................... 244/3.21
4,790,493 12/1988 Schwarzkopf et al. ........... 244/3.21

FOREIGN PATENT DOCUMENTS 500140 2/1954 Canada .................................. 244/190

Primary Examiner—Charles T. Jordan
Assistant Examiner—Rochelle Lieberman
Attorney, Agent, or Firm—Benjamin J. Barish

[57] ABSTRACT

A remotely-controlled aircraft comprises a sensor for sensing the actual rate-of-turn of the aircraft and for generating a rate-of-turn signal proportional thereto, which signal, inherently also proportional to the actual bank-angle of the aircraft, is applied to the aileron drive as a negative feedback signal with the bank-angle command signal to thereby stabilize the bank-angle of the aircraft. The aircraft includes a further sensor for sensing the actual rate-of-climb of the aircraft and for generating a rate-of-climb signal proportional thereto, which latter signal, inherently also proportional to the actual pitch-angle of the aircfaft, is applied to the elevator drive as a negative feedback signal with the pitch-angle command signal to thereby stabilize the pitch-angle of the aircraft.

16 Claims, 2 Drawing Sheets

APPARATUS AND METHOD FOR CONTROLLING AIRCRAFT, PARTICULARLY REMOTELY-CONTROLLED AIRCRAFT

BACKGROUND OF THE INVENTION

The present invention relates to apparatus and also to a method for controlling aircraft. The invention is particularly applicable for stabilizing remotely-controlled aircraft, such as model planes, target planes, and small remotely-piloted vehicles (RPV's), with respect to roll and pitch, and is therefore described below with respect to this application.

Many techniques have been proposed for providing remotely-controlled aircraft, such as model planes, with roll and pitch stabilization.

One known system for providing roll stabilization includes wing levellers; while this system produces reasonably good longterm stability, it is characterized by poor response to immediate command changes. Another known system for providing roll stabilization, and also pitch stabilization, includes a vertical gyro; however, this system is generally characterized by high power requirements, weight and price, and low reliability.

One known system for providing pitch stabilization includes a rate-gyro, but this system produces dynamic stabilization without position stabilization; that is, it generally does not maintain level flight for long time periods. A further known system for providing pitch stabilization includes mechanical or electro-mechanical height-hold altitude transducers, which sense the aircraft's rate-of-climb; such systems, however, are not precise because of hysteresis and low sensitivity, and are therefore usually suitable only to maintain level flight. A further known system includes electro-static stabilization; the disadvantages of such a system, however, include sensitivity to local climate changes and atmospheric disturbances, and the requirement for radioactive materials for plating the sensing electrodes.

BRIEF SUMMARY OF THE INVENTION

An object of the present invention is to provide apparatus and a method producing roll and/or pitch position stabilization in an aircraft, particularly a remotely-controlled aircraft, having advantages in the above respects.

According to one feature of the present invention, there is provided a remotely-controlled aircraft including ailerons for controlling the roll changes of the aircraft, an aileron drive, elevators for controlling the pitch changes of the aircraft, an elevator drive, and a receiver for receiving, from a remotely-located transmitter, a bank-angle command signal to be applied to the aileron drive for controlling the aircraft roll changes, and a pitch-angle command signal to be applied to the elevator drive for controlling the aircraft pitch changes; characterized in that the aircraft further includes a sensor for sensing the actual rate-of-turn of the aircraft and for generating a rate-of-turn signal proportional thereto, which signal is inherently also proportional to the actual bank-angle of the aircraft; and means for applying the rate-of-turn signal to the aileron drive as a negative feedback signal with the bank-angle command signal to thereby position stabilize the bank-angle of the aircraft.

According to another aspect of the invention, the aircraft includes a further sensor for sensing the actual rate-of-climb of the aircraft and for generating a rate-of-climb signal proportional thereto, which latter signal is inherently also proportional to the actual pitch-angle of the aircraft; and means for applying the rate-of-climb signal to the elevator drive as a negative feedback signal with the pitch-angle command signal to thereby position stabilize the pitch-angle of the aircraft.

It is to be particularly noted that the invention involves position stabilization, i.e., stabilization of the position of the aircraft with respect to the horizon. Position stabilization of the present invention is to be distinguished from dynamic stabilization, i.e., stabilizing the aircraft with respect to changes in pitch or roll without any reference to true position, which is known in the prior art.

The invention is capable of operating according to two modes, namely the Normal mode and the Automatic mode. In the Normal mode, the bank-angle and pitch-angle command signals specify the changes in the bank-angles and pitch-angles, and do not define a specific bank-angle or pitch-angle; whereas in the Automatic mode, the bank-angle and pitch-angle command signals determine the position of the aircraft, i.e., the actual bank-angle and pitch-angle, respectively.

As will become more apparent from the description below, the invention provides a number of important advantages over the above-described known stabilization techniques. Thus, the known rate-gyro techniques sense only rate-of-change of roll and pitch, and therefore small changes are not sensed and tend to accumulate. In the present invention, however, by sensing rate-of-turn, a signal proportional to the actual bank-angle is produced; and by sensing rate-of-climb, a signal proportional to the actual pitch-angle is produced; these latter signals are applied, with the bank-angle and pitch-angle command signals to the aileron and elevator drives, respectively, and constitute negative feedback signals tending to stabilize the aircraft with respect to bank-angle and pitch-angle.

For example, when the bank-angle command signal is given, the rate-of-turn sensor on the aircraft produces an output signal which opposes the bank-angle command signal, such that in the steady state, a constant bank-angle is achieved; this produces the commanded turn of the aircraft while the bank-angle is stabilized. Pitch-angle stabilization is produced in the same manner by the negative feedback signal generated by the rate-of-climb sensor, which measures the actual pitch-angle and not rate-of-change of pitch; this signal is applied to the aircraft elevator drive with the pitch-angle command signal and thereby produces the commanded climb of the aircraft while the pitch-angle is stablilized.

A further important advantage in the invention is that it may utilize conventional rate-of-turn and rate-of-climb sensors, presently used and available at reasonable cost in the radio-controlled model plane industry, in order to stabilize the aircraft with respect to bank-angle and pitch-angle.

According to a further feature included in the preferred embodiment of the invention described below, the bank-angle and pitch-angle command signals are transmitted by a radio link from a remotely-located radio transmitter; and the aircraft further includes preprogrammed position control means for generating position command signals; switching means normally applying the bank-angle and pitch-angle command signals from the radio transmitter to the aileron drive and elevator drive, respectively; and a radio link identifier effective, in response to interference or break in the radio link between the radio transmitter and the aircraft, to actuate the switching means and to cause it to apply the position command signals generated by the pre-programmed position control means to the aileron drive and elevator drive, respectively.

According to a still further feature there is provided an aircraft control system including a remotely-controlled aircraft as described above, and a radio transmitter including means for transmitting the bank-angle and pitch-angle command signals to the remotely-controlled aircraft via a radio link, and a mode selector for selecting either a Normal Mode of operation, or an Automatic Mode of operation; said aircraft including means effective when the transmitter selects a Normal Mode Of Operation normally to disable said bank-angle and pitch-angle stabilizations, but to enable said stabilizations, and also said pre-programmed position control means, in response to interference or break in the radio link; said aircraft including further means effective when the transmitter selects an Automatic Mode of Operation to enable said bank-angle and pitch-angle stabilizations and also to enable said pre-programmed position control means in response to interference or break in the radio link.

The invention also provides a method for controlling the bank-angle and pitch-angle of an aircraft, particularly a remotely-controlled aircraft, in accordance with the above-described technique.

BRIEF DESCRIPTION OF THE DRAWINGS

Further features and advantages of the invention will be apparent from the description below.

The invention is herein described, by way of example only, with reference to the accompanying drawings, wherein.

DESCRIPTION OF A PREFERRED EMBODIMENT

Overall System

Figure 1:
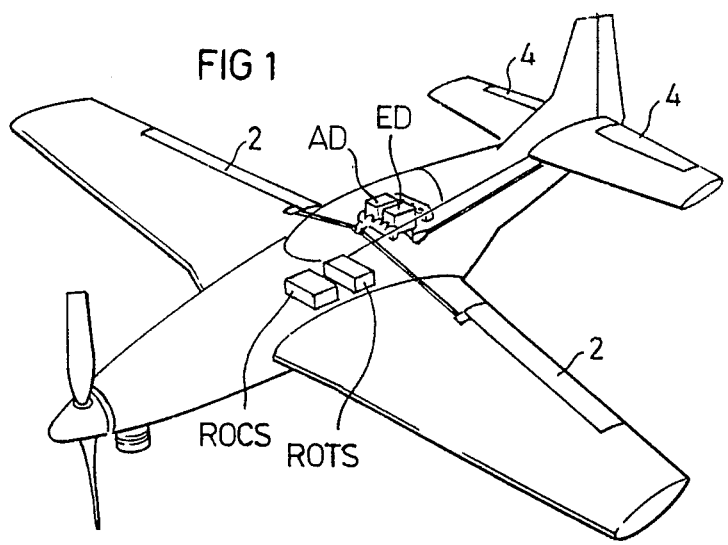
FIG. 1 diagrammatically illustrates a remotely-controlled aircraft constructed in accordance with the present invention.
Figure 2:
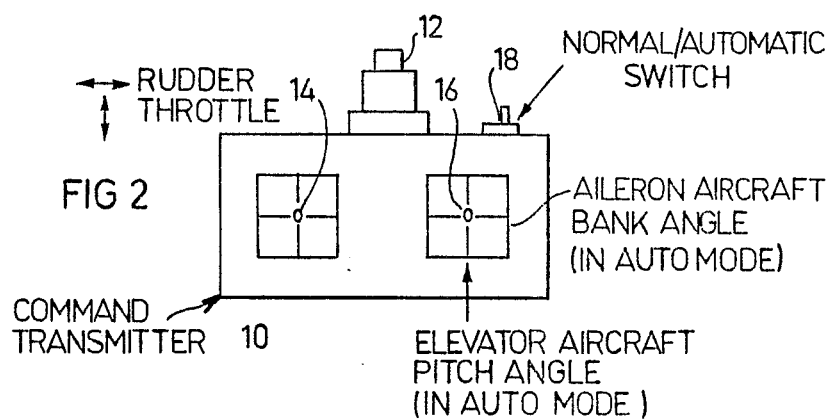
FIG. 2 illustrates the ground command transmitter for controlling the aircraft of FIG. 1.

FIG. 1 diagrammatically illustrates a remotely-controlled aircraft of conventional construction, including ailerons 2 for controlling aircraft roll-changes and elevators 4 for controlling the aircraft pitch changes. The ailerons 2 are driven by an aileron drive, schematically illustrated as AD, which may be a conventional aileron servo motor; and the elevators 4 are driven by an elevator drive, schematically indicated at ED, which may be a conventional elevator servo motor.

The aircraft illustrated in FIG. 1 further includes a rate-of-turn sensor, schematically indicated by block ROTS, and a rate-of-climb sensor, schematically indicated by block ROCS. Both sensors may be one of the known designs presently available at low cost for use in controlling radio-controlled model planes. As will be described more particularly below, the rate-of-turn sensor ROTS is used in the present invention to stabilize the aircraft with respect to roll (or bank-angle), and the rate-of-climb sensor ROCS is used to stabilize the aircraft with respect to pitch.

The aircraft of FIG. 1 is controlled by a command transmitter, generally designated 10, on the ground and provided with an antenna 12 for establishing communication with the airborne aircraft. Command transmitter 10 includes two manually-movable joysticks 14 and 16. Joystick 14 is movable vertically to control the throttle (or R.P.M.) drive on the aircraft, by generating R.P.M. command signals which are transmitted to the aircraft via antenna 12. Joystick 14 may also be moved horizontally to control the rudder (or turn) of the aircraft by generating turn command signals transmitted to the aircraft. In a similar manner, joystick 16 is movable vertically to generate pitch command signals to be transmitted to the elevator drive of the aircraft in order to control pitch or climb; whereas joystick 16 is movable in the horizontal direction to generate roll command signals to be transmitted to the aileron drive of the aircraft for controlling roll or turn of the aircraft.

The command transmitter 10 on the ground further includes a Mode Selector Switch 18, which may be positioned to select one of two modes: (1) a Normal Mode, in which the command transmitter operator directly controls the aircraft; or (2) an Automatic Mode, in which the manual command signals transmitted to the aircraft are modified by rate-of turn and rate-of climb signals to produce roll and pitch stabilization, as will be described more particularly below. The aircraft further includes pre-programmed position control means for generating position command signals, and a radio link identifier effective, in response to interference with, or break in, the radio link between the radio transmitter and the aircraft, to actuate switching means to apply the position command signals generated by the pre-programed position control means to the aileron drive and elevator drive, respectively. The latter operation is effective during both the Normal Mode and the Automatic Mode of operation as selected by the Mode Selector Switch 18 of the command transmitter 10.

Figure 3:
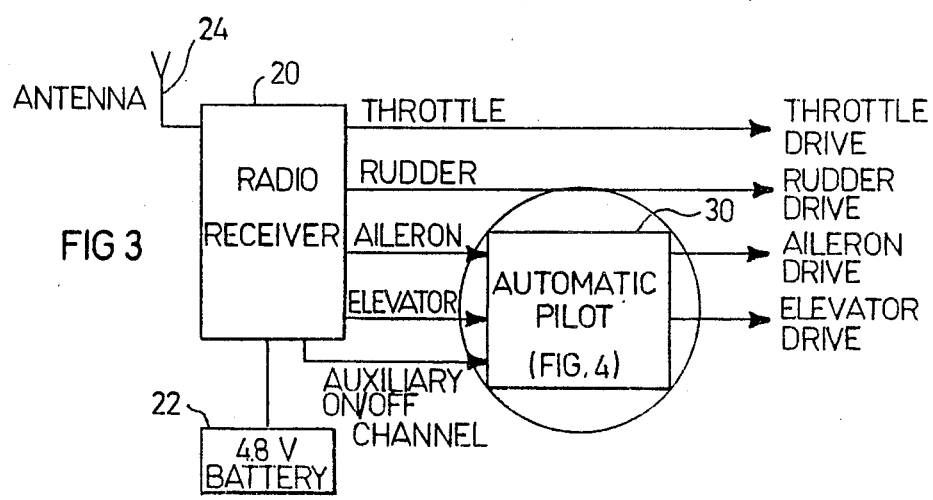
FIG. 3 is a block diagram illustrating the airborne control system in the aircraft, including an add-on unit constructed in accordance with the present invention.

FIG. 3 illustrates the system aboard the aircraft to receive the various command signals from the command transmitter 10 on the ground. Thus, the aircraft control system includes a radio receiver 20 supplied by battery 22 including antenna 24, as in a conventional system. Also as in a conventional system, the radio receiver 20 feeds the R.P.M. Command Signals and the Turn Command Signals to the throttle and rudder drive (not shown), respectively, of the aircraft. However, as distinguished from the conventional system, the roll command signals and the pitch command signals from the radio receiver 20 are not fed directly to the aileron and elevator drives, respectively, but rather are fed first to an add-on unit, generally designated 30, which modifies these signals before they are fed to the aileron and elevator drive.

Figure 4:
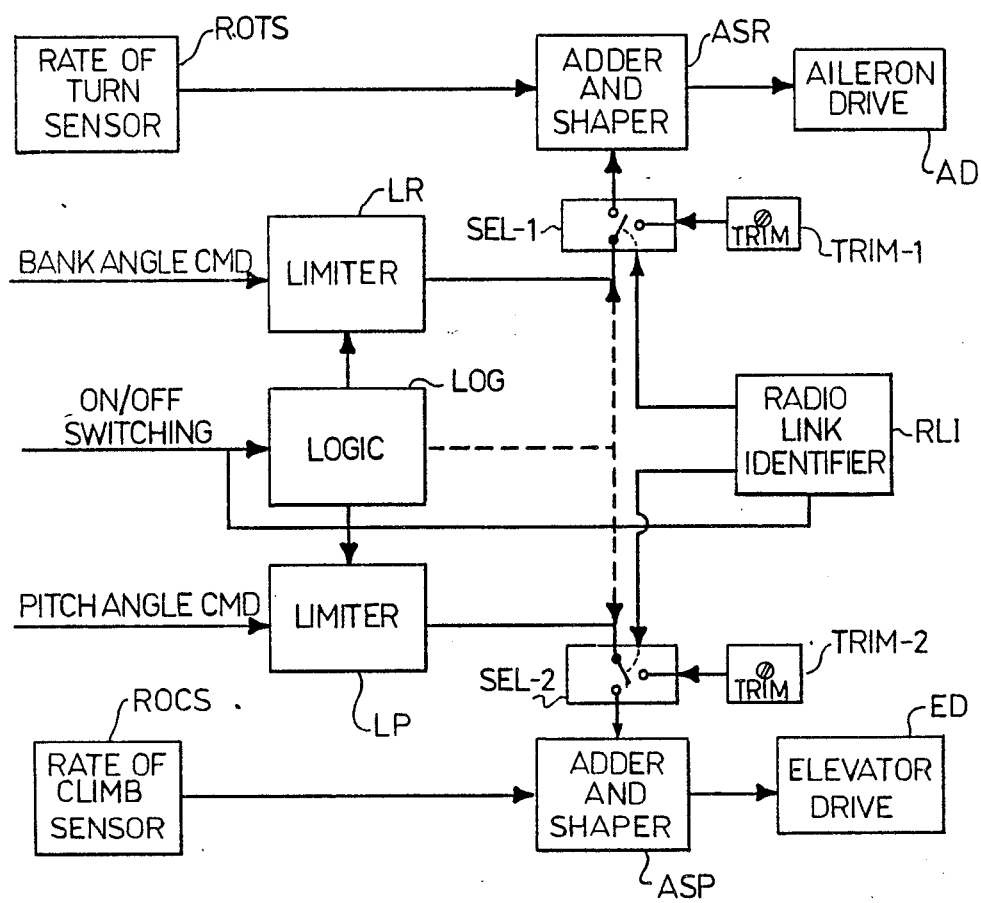
FIG. 4 is a block diagram illustrating one system constructed in accordance with the present invention which may be used as the add-on unit in the airborne control system of FIG. 3.

FIG. 4 more particularly illustrates the construction of the add-on unit 30 of FIG. 3. Thus, this unit includes, in addition to the rate-of-turn sensor ROTS and the rate-of-climb sensor ROCS mentioned above with respect to FIG. 1, the add-on unit 30 further includes a limiter circuit LR which receives the bank-angle command signal from the ground, and another limiter circuit LP which receives the pitch-angle command signal from the ground. Limiter circuit LR limits the bank-angle command signal to safe values, e.g., ±30°, to prevent turnover and instability before the signal is applied to the aileron drive AD; whereas limiter circuit LP limits the pitch-angle command signal to safe values, e.g., ±10°, to prevent stall and rapid descent before that signal is applied to the elevator drive ED.

The add-on unit 30 aboard the aircraft further includes an adder and shaper circuit ASR receiving both the signal from the rate-of-turn sensor ROTS and the bank-angle command signal from the limiter LR. Circuit ASR adds the signal from the rate of turn sensor ROTS, after limiting to a predetermined frequency, as a negative feedback signal to the bank-angle command signal from limiter LR, before applying the resultant signal to the aileron drive AD. Since the rate-of-turn signal is inherently also proportional to the actual bank-angle of the aircraft, it stabilizes the bank-angle of the aircraft when applied as a negative feedback signal with the bank-angle command signal to the aileron drive AD.

Similarly, the rate-of-climb signal from sensor ROCS is inherently also proportional to the actual pitch-angle of the aircraft. The latter signal is applied as a negative feedback signal with the pitch-angle command signal to a second adder and shaper circuit ASP. This latter circuit, after limiting to a particular frequency, produces the signal to the elevator drive ED which controls the pitch-angle of the aircraft. Thus, the signal from the rate-of-climb sensor ROCS, being applied as a negative feedback signal with the pitch-angle command signal, stabilizes the aircraft with respect to pitch-angle.

The add-on unit 30 (FIG. 3) aboard the aircraft further includes circuitry controlled by the Mode Selector Switch 18 of the transmitter 10 for operating the aircraft according to the Normal mode, wherein joystick 16 directly controls the aileron drive AD and the elevator drive ED, and thereby the position changes of the aircraft, or according to an Automatic Mode of operation wherein the latter drives are controlled by the roll and pitch stabilization means within the add-on unit 30 aboard the aircraft. Thus, the add-on unit 30 aboard the aircraft further includes a logic circuit LOG, a radio link identifier RLI, pre-programmed position control units TRIM-1 and TRIM-2, and two selector switches SEL-1 and SEL-2 both controlled by the radio link identifier RLI.

When the Mode Selector Switch 18 is in the Normal Mode, the aileron drive AD and elevator drive ED are both directly controlled by joystick 16 as will be described more particularly below; but when the Mode Selector Switch 18 is in the Automatic Mode, the bank-angle and pitch-angle commands, after being limited by the limiter circuits LR and LP, respectively, and after being added to the signals received from the rate-of-turn sensor ROTS and the rate-of-climb sensor ROCS, respectively, are applied to the aileron drive AD and the elevator drive ED, respectively.

The pre-programmed, failsafe, position control system installed in the add-on unit 30 is composed of the logic circuit LOG, constantly effective to enable the radio link identifier RLI to switch-in via selector switches SEL-1 and SEL-2. The pre-programmed failsafe position control system further includes the two units TRIM-1 and TRIM-2, which are pre-programmed position controls, to control the aileron drive AD and the elevator drive ED according to the pre-programmed bank-angle and pitch-angle, whenever the radio link identifier RLI detects interference with, or a break in, the radio transmission from the transmitter 10 to the receiver 20 aboard the aircraft, thereby attaining emergency pre-programmed aircraft position stabilization. Units TRIM-1 and TRIM-2 may be, for example, variable resistors each connected to a fixed voltage, the value of the resistor determining the voltage and the pre-programmed position of the aircraft, e.g. bank-angle 5 deg. right, pitch-angle 2 deg. up, resulting in an upgoing spiral.

The pre-programmed failsafe system assumes control automatically over the aircraft, when interference with, or a break in, the radio transmission is detected by radio link identifier circuit RLI.

The latter circuit controls the selector swiches SEL-1 and SEL-2 to switch the pre-programmed control units TRIM-1 and TRIM-2 to the adder and shaper circuits ASR and ASP, so as to cause the adder and shaper circuits ASR and ASP to apply the appropriate voltage to the aileron drive AD and the elevator drive ED, respectively, and thereby to pre-program the position stabilization of the aircraft. The above mentioned description applies regardless of the position of Mode Selector Switch 18, whether the mode selected is the Normal Mode or the Automatic Mode.

OPERATION

The system illustrated in the drawings operates as follows:

Normal Mode

When Mode Selector Switch 18 of the transmitter 10 is in the Normal Mode, logic circuit LOG controls the selector switches SEL-1 and SEL-2, of unit 30 aboard the aircraft, so as to connect the aileron drive AD and elevator drive ED of the aircraft to receive the commands from the command transmitter 10. During this mode of operation, the horizontal position of joystick 16 determines the roll or bank-angle change command transmitted to the receiver 20 aboard the aircraft, which command controls the aileron drive AD; and the vertical position of joystick 16 determines the pitch-change command applied to the elevator drive ED aboard the aircraft.

Thus, whenever it is desired to turn the aircraft, a turn command is transmitted by moving joystick 14 horizontally, or a bank-angle command is transmitted by moving joystick 16 horizontally. The turn command is applied directly to the rudder drive (not shown) of the aircraft in the conventional manner as shown in FIG. 3; or the bank-angle command is applied directly to the aileron drive AD; and the pitch-change command is applied directly to the elevator drive ED.

It will thus be seen that during the Normal Mode of operation, the above-described arrangements for stabilizing the roll and pitch of the aircraft are disabled, and the aircraft is controlled directly by the command signals transmitted by the operator as a result of eye contact with the aircraft. However, should radio contact be broken or interfered with, this would be detected by radio link identifier RLI, which thereby actuates the two selector switches SEL-1 and SEL-2, to disconnect the adder and shaper circuits ASR, ASP, from the limiter circuits LR and LP, receiving the commands from the transmitter, and to connect the pre-programmed position control means TRIM-1 and TRIM-2 to the adder and shaper circuits ASR, ASP. The aileron drive AD and elevator drive ED would thereby be controlled according to the pre-programmed position of units TRIM-1 and TRIM-2.

During this pre-programmed operation, the roll and pitch stabilization circuits are enabled. Thus, the rate-of-turn sensor ROTS is connected to circuit ASR so as to provide a negative feedback signal with the bank-angle command signal from unit TRIM-1, thereby stabilizing the aircraft with respect to bank-angle. Similarly, the rate-of-climb sensor ROCS is connected to circuit ASP, so as to apply a signal proportional to the actual pitch-angle of the aircraft as a negative feedback signal with the pitch-angle command signal from unit TRIM-2, thereby stabilizing the aircraft with respect to pitch-angle.

Automatic Mode

When the Mode Selector Switch 18 of the transmitter 10 is in the Automatic Mode, logic circuit LOG controls the selector switches SEL-1 and SEL-2 of unit 30 aboard the aircraft to connect the limiter circuits LR and LP to the adder and shaper circuits ASR and ASP. Limiter circuit LR limits the bank-angle command signal to safe values, e.g., ±30 degrees, to prevent turnover and instability, before the bank-angle command is applied to the adder and shaper circuit ASR.

The above-described bank-angle and pitch-angle stabilization circuits are also enabled during this Automatic Mode. Thus, as shown in FIG. 4, the adder and shaper circuit ASR also receives a rate-of-turn signal from the rate-of-turn sensor ROTS, which signal is applied as a negative feedback signal with the bank-angle command signal to the adder and shaper circuits ASR. As described earlier, the rate-of-turn signal from sensor ROTS is inherently proportional to the actual bank-angle of the aircraft, and therefore when it is applied as a negative feedback signal with the bank-angle command signal to the adder and shaper circuit ASR, before the latter signal is applied to the aileron drive AD, it stabilizes the bank-angle of the aircraft.

Pitch-angle stabilization of the aircraft is obtained in a similar manner by the rate-of-climb signal from sensor ROCS, the latter sequel is applied as a negative feedback signal with the pitch-angle command signal to the adder and shaper circuits ASP before the signal from the latter circuit is applied to the elevator drive ED. Thus, the rate-of-climb signal from sensor ROCS is inherently also proportional to the actual pitch-angle of the aircraft, and therefore when it is applied as a negative feedback signal with the pitch-angle command signal, it stabilizes the pitch-angle of the aircraft.

The above-described pre-programmed position control means, including units TRIM-1 and TRIM-2, are also enabled during the Automatic Mode, should radio contact be broken or interfered with. Thus, radio link identifier RLI, upon detection that radio contact is broken or interfered with, actuates the two selector switches SEL-1 and SEL-2, to disconnect the adder and shaper circuits ASR, ASP from the limiter circuits LR and LP, receiving the commands from the transmitter, and connects the pre-programmed position control units TRIM-1 and TRIM-2 to the adder and shaper circuits ASR, ASP. Accordingly, aileron drive AD and elevator drive ED are now controlled according to the pre-programmed position of units TRIM-1 and TRIM-2.

During this pre-programmed state of operation, the bank-angle and pitch of the aircraft are stabilized. Thus, the rate-of-turn sensor ROTS remains connected to circuit ASR so as to provide a negative feedback signal with the bank-angle command signal from unit TRIM-1, thereby stabilizing the aircraft with respect to bank-angle. Similarly, the rate-of-climb sensor ROCS remains connected to circuit ASP, so as to apply a signal proportional to the actual pitch-angle of the aircraft as a negative feedback signal with the pitch-angle command signal from unit TRIM-2, thereby stabilizing the aircraft with respect to pitch-angle.

While the invention has been described with respect to one preferred embodiment applicable to stabilizing remotely-controlled aircraft, such as model planes, target planes, and small remotely-piloted vehicles, it will be appreciated that the invention could also be applied in many types of civil aircraft and helicopters, for enabling flight of the aircraft for long distances in a pre-programmed state in the event of interference with or break in the radio link. Many other variations, modifications and applications of the invention will be apparent.

What is claimed is:

1. A remotely-controlled aircraft, including ailerons for controlling the roll changes of the aircraft, an aileron drive, elevators for controlling the pitch changes of the aircraft, an elevator drive, and a receiver for receiving, from a remotely-located transmitter, a bank-angle command signal to be applied to the aileron drive for controlling the aircraft roll changes, and a pitch-angle command signal to be applied to the elevator drive for controlling the aircraft pitch changes; characterized in that said aircraft further includes a sensor for sensing the actual rate-of-turn of the aircraft and for generating a rate-of-turn signal proportional thereto, which signal is inherently also proportional to the actual bank-angle of the aircraft; and means for applying said rate-of-turn signal to the aileron drive as a negative feedback signal with said bank-angle command signal to thereby position stabilize the bank-angle of the aircraft.

2. The aircraft according to claim 1, further characterized in that the aircraft also includes: a further sensor for sensing the actual rate-of-climb of the aircraft and for generating a rate-of-climb signal proportional thereto, which latter signal is inherently also proportional to the actual pitch-angle of the aircraft; and means for applying said rate-of-climb signal to the elevator drive as a negative feedback signal with said pitch-angle command signal to thereby position stabilize the pitch-angle of the aircraft.

3. The aircraft according to claim 2, wherein said bank-angle command signal is applied to the aileron drive by means which includes a limiter circuit for limiting the bank-angle command signal to safe values to prevent turnover, and an adder circuit including a low pass filter for optimizing the dynamic response characteristic of the aircraft, and for adding the rate-of-turn signal and the bank-angle command signal to produce an aileron drive signal applied to the aileron drive.

4. The aircraft according to claim 2, wherein said pitch-angle command signal is applied to the elevator drive by means which includes a limiter circuit for limiting the pitch-angle command signal to safe values to prevent stall and rapid descent, and an adder circuit including a low pass filter for optimizing the dynamic response characteristic of the aircraft, and for adding the rate-of-climb signal and the pitch-angle command signal to produce an elevator drive signal applied to the elevator drive.

5. The aircraft according to claim 2, wherein said bank-angle command signal and said pitch-angle command signal are transmitted by a radio link from a remotely-located radio transmitter; said aircraft further including pre-programmed position control means for generating position command signals; switching means normally applying said bank-angle and pitch-angle command signals from the radio transmitter to the aileron drive and elevator drive, respectively; and a radio link identifier effective, in response to interference with, or break in, the radio link between the radio transmitter and the aircraft, to actuate said switching means and to cause said switching means to apply said position command signals generated by said pre-programmed position control means to said aileron drive and elevator drive, respectively.

6. A remotely-controlled aircraft, comprising:
ailerons and a drive therefor for controlling the roll changes of the aircraft;
elevators and a drive therefor for controlling the pitch changes of the aircraft;
a receiver for receiving, from a remotely-located transmitter, a bank-angle command signal to be applied to the aileron drive for controlling the aircraft roll changes, and a pitch-angle command signal to be applied to the elevator drive for controlling the aircraft pitch changes;
a sensor for sensing the actual rate-of-climb of the aircraft and for generating a rate-of-climb signal proportional thereto, which latter signal is inherently also proportional to the actual pitch-angle of the aircraft;
and means for applying said rate-of-climb signal to the elevator drive as a negative feedback signal with said pitch-angle command signal to thereby position stabilize the pitch-angle of the aircraft.

7. The aircraft according to claim 6, wherein said aircraft also includes a sensor for sensing the actual rate-of-turn of the aircraft and for generating a rate-of-turn signal proportional thereto, which signal is inherently also proportional to the bank-angle of the aircraft; and means for applying said rate-of-turn signal to the aileron drive as a negative feedback signal with said bank-angle command signal to thereby position stabilize the bank-angle of the aircraft.

8. The aircraft according to claim 7, wherein said bank-angle command signal is applied to the aileron drive by means which includes a limiter circuit for limiting the bank-angle command signal to safe values to prevent turnover, and an adder circuit including a low pass filter for optimizing the dynamic response characteristic of the aircraft, and for adding the rate-of-turn signal and the bank-angle command signal to produce an aileron drive signal applied to the aileron drive.

9. The aircraft according to claim 7, wherein said pitch-angle command signal is applied to the elevator drive by means which includes a limiter circuit for limiting the pitch-angle command signal to safe values to prevent stall and rapid descent, and an adder circuit including a low pass filter for optimizing the dynamic response characteristic of the aircraft, and for adding the rate-of-climb signal and the pitch-angle command signal to produce an elevator drive signal applied to the elevator drive.

10. The aircraft according to claim 7, wherein said bank-angle command signal and said pitch-angle command signal are transmitted by a radio link from a remotely-located radio transmitter; said aircraft further including pre-programmed position control means for generating position command signals; switching means normally applying said bank-angle and pitch-angle command signals from the radio transmitter to the aileron drive and elevator drive, respectively; and a radio link identifier effective, in response to interference with, or break in, the radio link between the radio transmitter and the aircraft, to actuate said switching means and to cause same to apply said position command signals generated by said pre-programmed position control means to said aileron drive and elevator drive, respectively.

11. An aircraft control system including:
a remotely-controlled aircraft according to claim 10;
a radio-transmitter including means for transmitting the bank-angle and pitch-angle command signals to the remotely-controlled aircraft via a radio link; and
a mode selector for selecting either a Normal Mode of operation, or an Automatic Mode of operation;
said bank-angle and pitch-angle command signals, in the Normal mode, specifying the changes in the bank-angle and pitch-angle, and in the Automatic mode, specifying the actual bank-angle and pitch-angle;
said aircraft including means effective when the transmitter selects a Normal Mode of operation normally to disable said bank-angle and pitch-angle position stabilizations, but to enable said position stabilizations and also said pre-programmed position control means in response to interference or break in the radio link;
said aircraft including further means effective when the transmitter selects an Automatic Mode of operation, to enable said bank-angle and pitch-angle position stabilizations, and also to enable said pre-programmed position control means in response to interference with, or break in, the radio link.

12. A method for remotely-controlling an aircraft including ailerons for controlling the roll changes of the aircraft, an aileron drive, elevators for controlling the pitch changes of the aircraft, an elevator drive, and a receiver for receiving, from a remotely-located transmitter, a bank-angle command signal to be applied to the aileron drive for controlling the aircraft roll changes, and a pitch-angle command signal to be applied to the elevator drive for controlling the aircraft pitch changes; characterized in sensing the actual rate-of-turn of the aircraft and generating a rate-of-turn signal proportional thereto, which signal is inherently also proportional to the actual bank-angle of the aircraft; and applying said rate-of-turn signal to the aileron drive as a negative feedback signal with said bank-angle command signal to thereby position stabilize the bank-angle of the aircraft.

13. The method according to claim 12, further characterized in also sensing the actual rate-of-climb of the aircraft and generating a rate-of-climb signal proportional thereto, which latter signal is inherently also proportional to the actual pitch-angle of the aircraft; and applying said rate-of-climb signal to the elevator drive as a negative feedback signal with said pitch-angle command signal to thereby position stabilize the pitch-angle of the aircraft.

14. A method for remotely-controlling an aircraft ailerons for controlling the roll changes of the aircraft, an aileron drive, elevators for controlling the pitch changes of the aircraft, an elevator drive, and a receiver for receiving, from a remotely-located transmitter, a roll command signal to be applied to the aileron drive for controlling the aircraft roll changes, and a pitch-angle command signal to be applied to the elevator drive for controlling the aircraft pitch changes; characterized in sensing the actual rate-of-climb of the aircraft and generating a rate-of-climb signal proportional thereto, which latter signal is inherently also proportional to the actual pitch-angle of the aircraft; and applying said rate-of-climb signal to the elevator drive as a negative feedback signal with said pitch-angle command signal to thereby position stabilize the pitch-angle of the aircraft.

15. The method according to claim 14, further characterized in also sensing the actual rate-of-turn of the aircraft and generating a rate-of-turn signal proportional thereto, with latter signal is inherently also proportional to the actual bank-angle of the aircraft; and applying said rate-of-turn signal to the aileron drive as a negative feedback signal with said bank-angle command signal to thereby position stabilize the bank-angle of the aircraft.

16. The method according to claim 12, wherein said aircraft is remotely controlled by a remotely-located transmitter.

* * * * *